Patented July 8, 1952

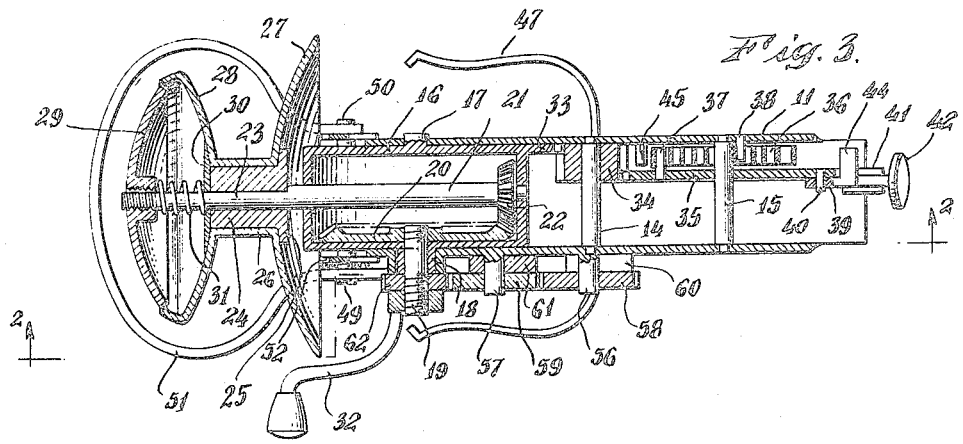
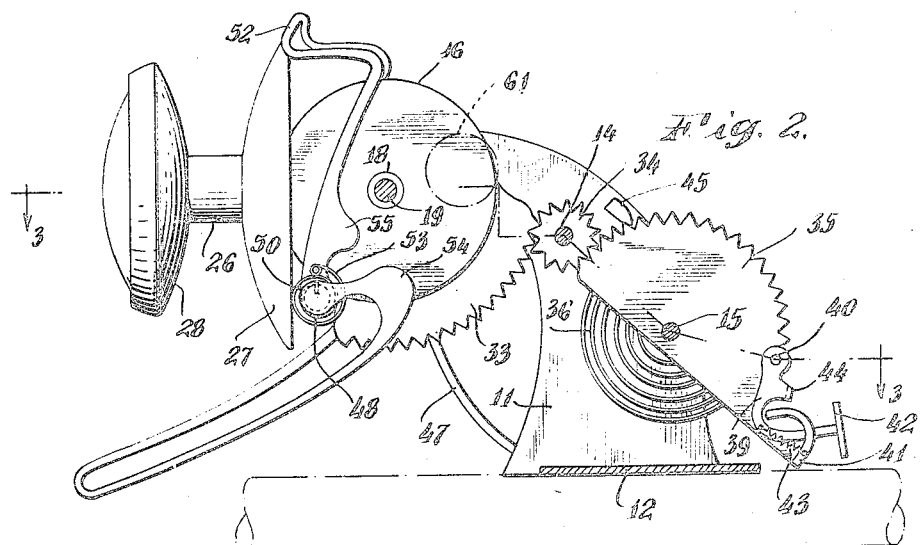
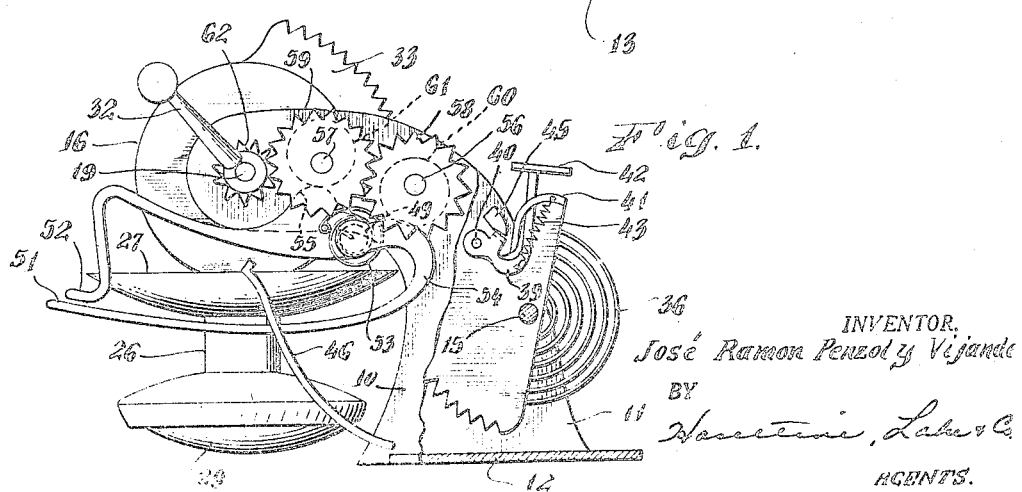

2,602,602

UNITED STATES PATENT OFFICE 2,602,602

FISHING REEL

José Ramon Penzol y Vijande, Rivadeo, Spain

Application January 29, 1948, Serial No. 4,987
In Spain October 17, 1947

6 Claims. (Cl. 242—84.4)

This invention relates to fishing reels, and more particularly to fishing reels of the types in which the reel or drum upon which the line is wound is turnable from a winding position, having its axis of rotation at right angles to the longitudinal axis of the rod, to a casting position in which the axis of rotation is parallel to the axis of the rod so that the line may uncoil from one end of the drum without requiring the rotation of the latter.

A difficulty that has been encountered in reels of the described type springs from its most desirable characteristic, that is, the substantial lack of resistance to the uncoiling of the line when the drum is in the casting position. In prior reels of this type, the drum was turned to the casting position preparatory to the making of a cast. Once the drum is in this position, the weight of the lure or spoon on the end of the line is sufficient to unwind the line from the spool or drum. To prevent such premature unwinding of the line with these prior reels it is necessary to grasp the line or to press it against the rod and to release the line during the casting operation. Furthermore, in prior reels of this type provided with even winding devices for insuring uniform winding of the line onto the spool or drum, such devices interfered with the free uncoiling of the line from the drum during casting, or following a cast the fisherman had to engage the line in the guide of the even winding device before re-winding the line on the drum. All of these difficulties made it necessary for a fisherman to acquire considerable skill in the use of reels of the described character before he could effectively realize a profit from their inherent advantages, and even after achieving such skill the difficulties set forth reduced the speed with which the reel could be changed from the casting to winding position and back to the casting position.

A primary object of this invention is to provide a fishing reel of the type described in which the drum is easily and rapidly movable from a winding to a casting position and back, and having a device for insuring the even winding of the line on the drum which device is remote and disengaged from the line when the drum is in its casting position.

Another object of this invention is to provide a fishing reel of the aforesaid character in which the drum is spring urged to its winding position and locked in such winding position; and wherein a releasing device is provided for the drum lock, which when actuated releases the lock and simultaneously swings the drum to its casting position so that the drum may be moved to the casting position during the actual casting operation to thereby obtain positive control over the unwinding of the line.

A further object is to provide a fishing reel having the above features in which the drum is returned to the winding position merely by releasing the actuating pressure on the releasing device to thereby stop the unwinding of the line.

Still another object is to provide a fishing reel of the described type having a device for insuring even winding of the line on the drum, which device is remote and disengaged from the line when the drum is in casting position and is returned to operative oscillating position when the drum is moved to its winding position; and wherein the even winding device when operative makes contact with the line automatically and without intervention by the fisherman.

A still further object is to provide a fishing reel of the described type having suitable guide wires engaging the large diameter end of the drum when the latter is in winding position and preventing the entanglement of the line with the winding crank or other elements of the reel.

Fnally, it is an object of this invention to provide a fishing reel having the above mentioned characteristics which is relatively simple in construction, sturdy, and dependable in operation.

These and other objects, features and advantages of the invention will appear in the following detailed description of a specific embodiment read in conjunction with the accompanying illustrative drawing.

In the drawing:

Figure 1 is a side elevational view, partly broken away, of a fishing reel constructed according to an embodiment of this invention, and with the spool or drum shown in its winding position;

Figure 2 is a longitudinal vertical sectional view, taken on the irregular line 2—2 of Figure 3, and showing the spool or drum in casting position; and Figure 3 is a transverse sectional view of the reel in the position illustrated in Figure 2, and taken along the irregular line 3—3 of Figure 2.

Referring to the drawing, wherein like reference characters in the several views indicate like parts, a fishing reel constructed according to this invention is shown to include a support formed of a pair of standards formed of substantially flat plates 10 and 11 each having curved side edges to provide a base portion and a right angularly extending portion. The bottom edges of the plates 10 and 11 are joined together by a web 12, which preferably extends beyond the standards to provide a lug for attachment to the support by suitable well known means to a fishing rod 13, shown in broken lines in Figure 2. In addition to the web 12, spaced parallel shafts 14 and 15 extend between plates 10 and 11 for retaining the latter in parallel spaced relation.

A cylindrical casing 16 is rotatably journalled between the free ends of the plates 10 and 11 by the stud shaft 17 extending from one side of the casing and rotatably received in a suitable opening formed in plate 11, and by the hollow cylindrical boss 18 extending from the other side of the casing through the plate 10. A drive shaft 19 is rotatably received in hollow boss 18 and a bevel gear wheel 20 is fixed to the inner end of shaft 19 within casing 16. A shaft 21 extends diametrically across casing 16 and is rotatably journalled in the cylindrical wall of the latter. A beveled pinion 22 is fixed on shaft 21 and meshes with gear wheel 20. One end of shaft 21 extends out of casing 16 and is flattened as at 23. A bushing 24 is formed with a non-circular bore receiving the flattened portion of shaft 21 for non-rotatably mounting the bushing on the shaft. The bushing 24 is formed with a radially extending flange 25 adjacent its inner end, and a spool or drum 26 is slidable over bushing 24. Drum 26 is provided with a flange 27 of large diameter at the end bearing against flange 25 of the bushing, and with a flange 28 of relatively small diameter at its outer end. Flanges 27 and 28 are outwardly concave, as seen in Figure 3. The outer extremity of shaft 21 is threaded and threadedly receives a disc-shaped member 29. A braking washer 30 is positioned on shaft 21 and bears against flange 28 under the influence of coil spring 31 which abuts against member 29. By increasing the compression of spring 31 the drum 26 can be made to rotate with shaft 21, and similarly by reducing the spring load upon washer 30 the drum may be freed for rotation relative to the shaft. A suitable radially extending crank 32 is fixed upon the outer end of shaft 19 to provide means for manually rotating drum 26 through gears 20 and 22 and shaft 21.

The side wall of casing 16 adjacent to plate 11 is formed with an extension 33 having a toothed periphery forming a toothed quadrant. An idler pinion 34 is rotatable on fixed shaft 14 and meshes with toothed quadrant 33 as well as with a semi-circular gear wheel 35 rotatably mounted on shaft 15. It is apparent that rotation of gear 35 in a clockwise direction as viewed in Figures 1 and 2 will effect movement of drum 26 from the winding position of Figure 1 to the casting position of Figure 2. A flat spiral spring 36 is disposed around shaft 15, and one end of spring 36 is fixed by suitable means to lug 37 on gear wheel 35 while the other end is fixed to lug 38 on plate 11. Spring 36 is so disposed as to constantly urge gear wheel 35 to rotate in a counter-clockwise direction, as viewed in Figures 1 and 2, to thereby move the drum 26 to the winding position (Figure 1).

A curved arm 39 is pivoted at one end of a stud 40 extending laterally from the semi-circular gear wheel 35 adjacent one end of the toothed periphery of the latter. A longitudinally arcuate slotted guide 41 extends from the gear wheel 35 and loosely receives curved arm 39. A thumb rest or button 42 is fixed upon the free end of curved arm 39, and a coil spring 43 connected at its opposite ends to guide 41 and arm 39 urges the latter to rotate in a counter-clockwise direction as viewed in Figures 1 and 2. A laterally extending lug 44 is formed on the curved arm 39 for engagement with a stop 45 fixed on plate 11. Stop 45 is formed with a curved top surface for smoothly depressing lug 44 when the latter swings by stop 45 in a counter-clockwise direction during movement of the drum 26 toward the winding position (Figure 1) under the influence of spring 36. When the drum is in such winding position, lug 44 engages against the lower surface of stop 45 and locks the gear segment 35 to prevent rotation of the latter. When it is desired to swing drum 26 to the casting position (Figure 2), pressure is continuously applied on thumb rest 42, which pressure initially depresses lug 44 against the force of spring 43, so that the lug clears stop 45, and subsequently the continued pressure applied to thumb rest 42 effects rotation of gear segment 35 on shaft 15 in a clockwise direction. The clockwise rotation of gear segment 35 is transmitted to toothed quadrant 33 by pinion 34, and casing 16 swings on its axis to move drum 26 to the casting position parallel to the axis of rod 13. As soon as the pressure exerted on thumb rest 42 is released, the spiral spring 36 will effect the return of the drum to its winding position at right angles to the axis of rod 13.

Curved resilient guide wires 46 and 47 are fixed to the base portions of plates 10 and 11, respectively, and extend upwardly and forwardly therefrom in a general direction toward the axis of rotation of casing 16 (Figure 1). The free ends of wires 46 and 47 are bent inwardly toward each other (Figure 3), and these inwardly bent ends engage over the edge of the large diameter flange 27 of drum 26 when the latter is in winding position (Figure 1). When drum 26 is in casting position (Figures 2 and 3), the guide wires 46 and 47 are disengaged from the drum.

Ears 48 extend from each of the side walls of casing 16 and are provided with studs 49 and 50, respectively, extending outwardly therefrom. Substantially U-shaped line distributing forks 51 and 52 are pivotally mounted at the ends of their side legs upon studs 49 and 50. As seen in Figure 3, the pivoted ends of distributing fork 52 are disposed inwardly of the pivoted ends of fork 51, and a spiral spring 53 is disposed around stud 49, between the pivoted ends of forks 51 and 52, and has its opposite ends bearing against the edges of the forks for urging the latter apart into the position illustrated by Figure 2. Furthermore, the side legs of forks 51 and 52 adjacent to plate 10 of the supporting frame are formed with shoulders 54 and 55, respectively, for a purpose hereinafter disclosed.

Spaced apart studs 56 and 57 extend outwardly from plate 10, and meshing spur gears 58 and 59, respectively, are rotatable thereon. Gears 58 and 59 have eccentric cam members 60 and 61, respectively, fixed on their inner surfaces and rotatable therewith. Cam members 60 and 61 engage against shoulders 54 and 55, respectively, when the drum is in its winding position (Figure 1). A driving gear 62 is fixed on shaft 19 and meshes with gear 59 so that rotational movement of shaft 19 and hence drum 26 is accompanied by rotation of cams 60 and 61. As seen in Figure 1, cams 60 and 61 are fixed on their respective gears 180° out of phase and the shoulders 54 and 55 which they engage are disposed on opposite sides of pivot 49, so that rotation of the cams will effect the swinging of line guiding forks together to and fro across the length of drum 26 for evenly winding the line on the latter. When the drum is moved to casting position shoulders 55 and 54 swing clear of the respective cams (cam 61 being shown in broken lines in Figure 2), and the spring 53 spreads guide forks 51 and 52 apart to positions in which they do not interfere with or obstruct the uncoiling of the line from the drum. It is to be understood that forks 51 and 52 are each formed so that they are free to undergo their respective movements without contacting the drum 26 or each other, and without obstructing movement of the drum between the casting and winding positions.

In using the reel described above and illustrated in the drawing, the reel is affixed to a rod 13 by its base plate 12, and the drum 26 will be retained in winding position (Figure 1) by spring 36 and the coaction of lug 44 with stop 45. Upon initiating a cast, the thumb rest is forced downwardly releasing the lock and swinging gear segment 35 for moving the drum to the casting position. Since the release and movement of the drum to casting position is procured by the simple exertion of pressure on the thumb rest, this movement can be effected during the actual cast, and therefore the possibility of premature uncoiling of the line is obviated. The movement of the drum to casting position will simultaneously move the line guiding forks 51 and 52 to remote positions, as set forth above, and the line is uncoiled from the drum or spool by the weight of the lure or spoon without the friction usually associated with the passage of the line through guiding eyes. As soon as pressure on thumb rest 42 is relieved, the spring 36 will return the drum to winding position, so that the uncoiling of the line off the spool or drum can be effectively arrested during the cast merely by removing the thumb from rest 42. Movement of the drum to its winding position will be accompanied by the swinging together of guide forks 51 and 52, which will dispose the line between such forks. Finally, the guide wires 46 and 47 will engage the edge of the large diameter flange 27 and prevent the entanglement of any loose loops on the drum with the operating mechanism thereabove.

Having thus described a specific embodiment of the invention, it is to be understood that changes and modifications, obvious to those skilled in the art, may be effected without departing from the scope of the invention as defined in the appended claims.

What is claimed is:

1. A fishing reel comprising a frame having a base for attachment to a fishing rod, a casing carried by said frame and rotating in a plane extending through the longitudinal axis of the rod, a rotatable drum shaft extending radially out of said casing, a drum on said shaft, means on said shaft engaging said drum and resisting rotation of the latter relative to said shaft, a driving shaft rotatable in said casing and extending axially therefrom, gear means in said casing operatively connecting said driving shaft to said drum shaft, a rotatable actuating member carried by said frame and swinging in a plane parallel to the plane of rotation of said casing, means operatively connecting said rotatable actuating member to said casing for swinging said drum between a winding position having its axis of rotation at right angles to the longitudinal axis of the rod and a casting position having its axis of rotation disposed parallel to the longitudinal axis of the rod, resilient means operatively connected to said actuating member and constantly urging the latter to rotate in the direction moving said drum to said winding position, interengageable locking means carried by said frame and said actuating member for locking the latter in a position disposing said drum in said winding position, manually operable releasing means rockably carried by said actuating member in a plane parallel to the plane of rotation of the latter and releasing said locking means when rocked in a direction opposed to the direction in which said resilient means urges said actuating member, and means limiting the rocking of said releasing means relative to said actuating member in the direction effecting release of said locking means whereby the continued manual exertion of pressure against said releasing means in the direction effecting release of said locking means will release said locking means and rotate said actuating member in the direction opposed to the action of said resilient means for moving said drum to its casting position.

2. A fishing reel according to claim 1, wherein said actuating member consists of a gear segment, and wherein said means operatively connecting said rotatable actuating member to said casing includes a toothed quadrant extending peripherally from said casing in the plane of rotation of the latter and a pinion rotatably carried by said frame and meshing with said toothed quadrant and said gear segment.

3. A fishing reel according to claim 1; wherein said releasing means includes a longitudinally curved arm pivoted at one end on said actuating member, and a thumb rest on the other end of said arm; and wherein said locking means includes a laterally extending lug on said curved arm, spring means connected to said arm and urging the latter to rotate in a direction moving said lug outwardly from the periphery of said actuating member, which direction coincides with the direction in which said resilient means urges said actuating member, and a stop fixed on said frame lying in the path of travel of said lug when the latter is extended by said spring means.

4. A fishing reel according to claim 1; including axially extending pivot members on said casing spaced radially from the axis of rotation of the latter, upper and lower substantially U-shaped line guiding forks pivotally mounted at the ends of their side legs on said pivot members, spring means constantly urging said upper and lower guiding forks apart, shoulders on said upper and lower guiding forks at opposite sides of said pivot members, and guiding fork operating means on said frame engaging said shoulders when said casing is rotated to dispose said drum in its winding position and swinging said upper and lower guiding forks into confronting relation for entraining the line therebetween, said guiding fork operating means being operatively connected to said driving shaft and reciprocating said upper and lower guiding forks together when said drum is rotated while in its winding position.

5. A fishing reel according to claim 4, wherein said guiding fork operating means includes a pair of spaced laterally extending studs carried by said frame, a gear rotatable on each of said studs meshing with each other, an eccentric cam fixed to each gear, said cams being disposed 180° out of phase and engaging said shoulders when said drum is in its winding position, and a driving gear fixed on said driving shaft and meshing with one of said gears on said studs.

6. A fishing reel according to claim 1; wherein said drum is formed with a relatively large diameter radial flange at the end thereof adjacent said casing and with a relatively small diameter radial flange at the other end, and including a pair of curved resilient guide wires fixed to the base of said frame and extending therefrom towards the axis of rotation of said casing, the free ends of said guide wires being bent inwardly towards each other and engaging the periphery of said relatively large diameter flange when said drum is in its winding position to thereby prevent entanglement of the line with the several parts of the reel during winding of the line onto said drum.

JOSÉ RAMON PENZOL Y VIJANDE.

REFERENCES CITED

The following references are of record in the file of this patent:

FOREIGN PATENTS

| Number | Country | Date |
|---|---|---|
| 15,756 | Great Britain | Mar. 23, 1911 |
| 150,443 | Great Britain | Sept. 6, 1920 |
| 203,892 | Switzerland | July 1, 1939 |
| 211,406 | Great Britain | Feb. 21, 1924 |